United States Patent
Wong

(10) Patent No.: US 7,487,149 B2
(45) Date of Patent: Feb. 3, 2009

(54) METHOD AND APPARATUS FOR PROVIDING QUERY-LEVEL SECURITY IN A DATABASE SYSTEM

(75) Inventor: Daniel ManHung Wong, Sacramento, CA (US)

(73) Assignee: Oracle International Corporation, Redwood Shores, CA (US)

( * ) Notice: Subject to any disclaimer, the term of this patent is extended or adjusted under 35 U.S.C. 154(b) by 425 days.

(21) Appl. No.: 10/800,315

(22) Filed: Mar. 10, 2004

(65) Prior Publication Data

US 2005/0203886 A1 Sep. 15, 2005

(51) Int. Cl.
*G06F 17/30* (2006.01)
(52) U.S. Cl. .................. 707/6; 726/23; 707/3
(58) Field of Classification Search ............. 707/1–6; 726/1, 2, 22–30
See application file for complete search history.

(56) References Cited

U.S. PATENT DOCUMENTS

| | | | | |
|---|---|---|---|---|
| 4,991,087 | A * | 2/1991 | Burkowski et al. | 707/3 |
| 5,819,288 | A * | 10/1998 | De Bonet | 707/2 |
| 6,167,523 | A * | 12/2000 | Strong | 726/21 |
| 6,240,407 | B1 * | 5/2001 | Chang et al. | 707/2 |
| 6,347,314 | B1 * | 2/2002 | Chidlovskii | 707/3 |
| 6,557,009 | B1 * | 4/2003 | Singer et al. | 707/104.1 |
| 7,194,451 | B2 * | 3/2007 | Chaudhuri et al. | 707/2 |
| 2003/0014394 | A1 * | 1/2003 | Fujiwara et al. | 707/3 |

OTHER PUBLICATIONS

ASP Alliance, http://www.aspalliance.com, Dec. 29, 2003.*
The PHP Group, http://www.php.net/, Nov. 27, 2003.*
Waybackmachine, http://web.archive.org/web/20031229145454/http://authors/aspalliance.com/aspxtreme/webforms/validation/introductiontovalidatinguserinputinwebforms.aspx.*
Waybackmachine, http://web.archive.org/web/20031127041408/http://us2.php.net/errorfunc.*
PBDR, http://pbdr.com/vbtips/asp/ReplaceSQL.htm, Jun. 24, 2003
Waybackmachine, http://web.archive.org/web/20030624033542/http://www.pbdr.com/vbtips/asp/ReplaceSQL.htm.*
Sin Yeung Lee et al.: "Learning fingerprints for a database intrusion dectection system" Computer security—Esorics 2002. 7th European Symposium on Research in Computer Security. Proceedings (Lecture Notes in Computer Science vol. 2502) Springer-Verlag Berlin Germany, 'Online! 2002, pp. 264-279, XP002336186 ISBN: 3-540-44345-2 Retrieved from the Internet: URL:http://www.springerlink.com/media/87EXNPMXRL03JQ64QWTM/Contributions/N/T/K/1/NTK16QDVfJHRBDJA.pdf 'retrieved on Jul. 14, 2005.
Daniel Lutz: "Vertiedigung gegen SQL-Injection-Angriffe" Semesterarbeit Department Für Informatik Eidgenössische Technische Hochschule Zürich, CH Retrieved from the Internet URL:http://www.infsec.ethz.ch/people/psevinc/sqliadReport/pdf> 'retrieved on Jul. 14, 2005.

(Continued)

*Primary Examiner*—Pierre M Vital
*Assistant Examiner*—Christopher J Raab
(74) *Attorney, Agent, or Firm*—Park, Vaughan & Fleming LLP; Edward J. Grundler

(57) ABSTRACT

One embodiment of the present invention provides a system that facilitates using query signatures to provide security for a database system. During operation, the database system receives a query. Next, the system parses the query to determine a signature for the query. This signature specifies a structure based on operators for the query and is independent of the value of literals in the query. The system then determines if the signature can be found in a signature cache which contains valid query signatures. If so, the system processes the query.

15 Claims, 5 Drawing Sheets

OTHER PUBLICATIONS

Chris Anley: "Advanced SQL Injection In SQL Server Applications" NGSSOFTWARE Insight Security Research (NISR) Publication, "Online! 2002, pp. 1-25, XP002336188 Retrieved from the Internet" URL:http://www.nextgenss.com/papers/advanced_sql_injection.pdf> 'retrieved on Jul. 14, 2005.

Publication: "Access control in a relational data base management system by query modification" by Stonebraker and Wong, Proc.ACM Ann. Conf. San Diego, Ca, Nov. 1974, pp. 180-187.

* cited by examiner

METHOD AND APPARATUS FOR PROVIDING QUERY-LEVEL SECURITY IN A DATABASE SYSTEM

BACKGROUND

1. Field of the Invention

The present invention relates to database security. More specifically, the present invention relates to a method and an apparatus for providing query-level security for a database system.

2. Related Art

Databases commonly store highly sensitive data, such as salaries, corporate financial data, and even classified military secrets. Consequently, database systems are typically designed to prevent unauthorized accesses to sensitive data. This problem is compounded by the fact that middle-tier applications often access a database on behalf of various users. Consequently, the database system must often rely on applications to provide access control mechanisms. Although applications that access databases typically ensure that a given query originates from an authorized user, many of these applications are vulnerable to a form of attack known as "SQL injection."

In order to perform SQL injection, a user provides an input to an application which includes an SQL statement. In doing so, the user knows that the application will incorporate this input, which includes the SQL statement, into a query, and that the SQL statement will cause the query to retrieve data which is different from the data that the application intended to retrieve.

For example, suppose a user enters the value "5" into a ProdID field of a web form, so that the web form submits the value 5 to an associated application. The application then forms a SQL statement such as:

SELECT prize, color FROM inventory WHERE ProdID=5.

This query returns the values from the prize and color columns of the inventory table for an entry where the ProdID field contains the value 5.

Instead of simply entering the value "5" into the web form, the user can input the string "5 OR 1=1" into the web form. When the application substitutes this string into the query, the following query is formed.

SELECT prize, color FROM inventory WHERE ProdID=5 OR 1=1.

This query, in contrast to the original query, returns values from the prize and color columns in every row of the inventory table!

The above is just one example of SQL injection. This is a well-known problem and will not be described further.

Currently, database applications perform tests on queries to detect SQL injection. While these tests can be effective, there are many drawbacks to this solution. Requiring each application to perform tests for SQL injection requires a significant amount of effort on the part of the application developers to include code into applications to perform these tests. Additionally, since different applications are typically developed by different developers, there is generally a lack of consistency in applying these tests across different applications.

Hence, what is needed is a method and an apparatus for providing query-level security for a database without the problems described above.

SUMMARY

One embodiment of the present invention provides a system that facilitates using query signatures to provide security for a database system. During operation, the database system receives a query. Next, the system parses the query to determine a signature for the query. This signature specifies a structure based on operators for the query and is independent of the value of literals in the query. The system then determines if the signature can be found in a signature cache which contains valid query signatures. If so, the system processes the query.

In a variation of this embodiment, if the signature is not in the signature cache, the system triggers a mismatch alert.

In a further variation, the mismatch alert throws an error.

In a further variation, the mismatch alert is sent to a database administrator and the query is processed.

In a further variation, the mismatch alert is sent to a requesting application, thereby allowing the requesting application to take action.

In a further variation, the signature cache is initialized by recording signatures of valid transactions during a system initialization operation.

In a further variation, if the signature generates a mismatch alert and if the query is a valid query, the system allows a database administrator to add the signature to the signature cache.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Database System

Figure 1:
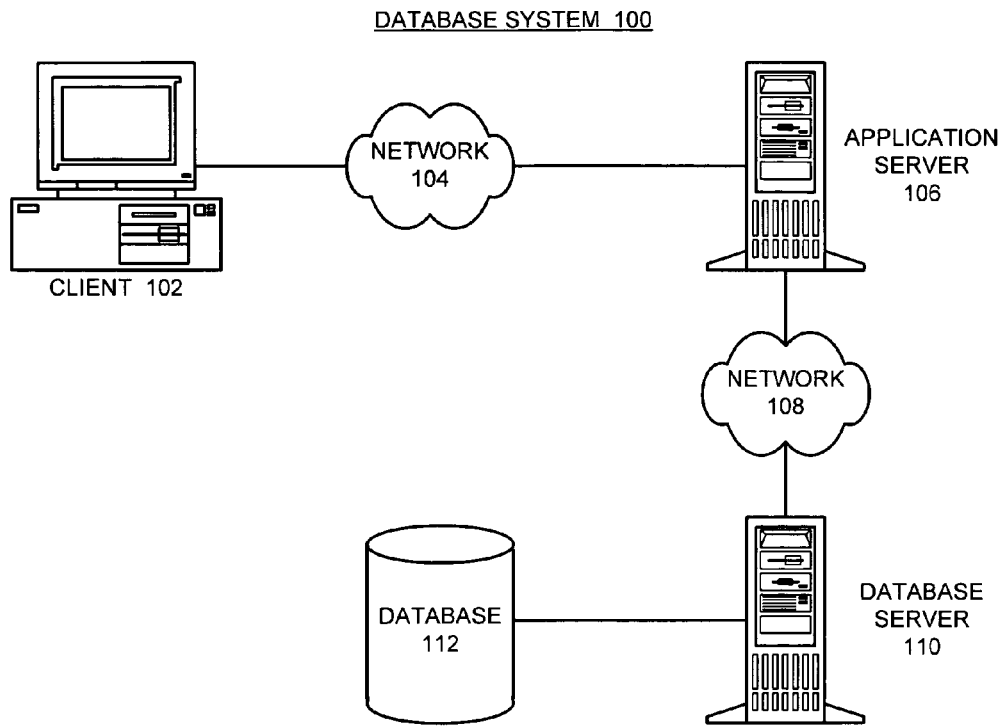
FIG. 1 illustrates a database system in accordance with an embodiment of the present invention.

FIG. 1 illustrates a database system 100 in accordance with an embodiment of the present invention. Database system 100 includes client 102, application server 106, database server 110, and database 112. Client 102 is coupled to application server 106 across network 104, while database server 110 is coupled to application server 106 across network 108. Database 112 is coupled to database server 110.

Networks 104 and 108 can generally include any type of wire or wireless communication channel capable of coupling together computing nodes. This includes, but is not limited to, a local area network, a wide area network, or a combination of networks. In one embodiment of the present invention, networks 104 and 108 include the Internet. Network 108 can also be a private network. Note that in some configurations application server 106 and database server 110 can be hosted by the same computer system.

Database 112 can include any type of system for storing data in non-volatile storage. This includes, but is not limited to, systems based upon magnetic, optical, and magneto-optical storage devices, as well as storage devices based on flash memory and/or battery-backed up memory.

Client 102 allows a user (not shown) to enter data through a web browser. This data is sent to application server 106 across network 104. Application server 106 then forms a SQL query using the data supplied by client 102 and forwards this SQL query to database server 110 across network 108.

Database server 110 validates the query and, if valid, performs the requested operation on database 112. In doing so, the system returns any requested data to application server 106. If the query is not valid, database server 110 triggers a mismatch alert.

Client

Figure 2:
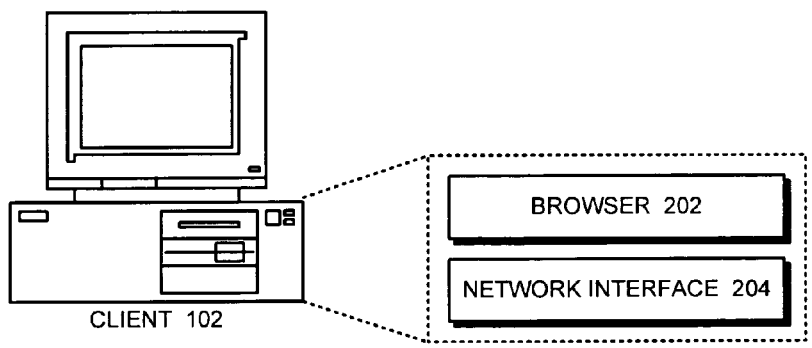
FIG. 2 illustrates a client in accordance with an embodiment of the present invention.

FIG. 2 illustrates client 102 in accordance with an embodiment of the present invention. Client 102 includes browser 202 and network interface 204. Browser 202 can generally include any type of web browser capable of viewing a web site, such as the INTERNET EXPLORER™ browser distributed by the Microsoft Corporation of Redmond, Wash. A user enters data for an application running on application server 106 through browser 202. This data is sent to the application running on application server 106 across network 104 by network interface 204. Network interface 204 also receives data from the application running on application server 106 and provides this data to browser 202 so that browser 202 can display the data to the user.

Application Server

Figure 3:
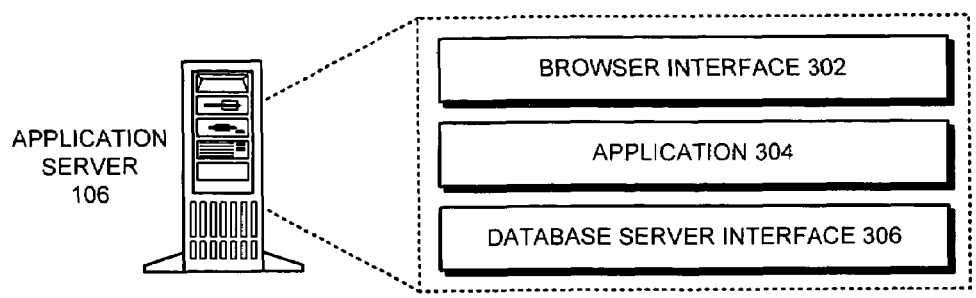
FIG. 3 illustrates an application server in accordance with an embodiment of the present invention.

FIG. 3 illustrates application server 106 in accordance with an embodiment of the present invention. Application server 106 includes browser interface 302, application 304, and database server interface 306. Browser interface 302 includes a web site that communicates with browser 202 across network 104. This web site provides web pages to be presented to a user by browser 202 and receives data entered by the user. The data entered by the user is forwarded to application 304.

Application 304 incorporates the data received from the user into SQL queries and forwards these queries to database server 110 through database server interface 306. In the other direction, database server interface 306 receives data from database server 110 and forwards this data to application 304, which forwards the data to client 102.

Database Server

Figure 4:
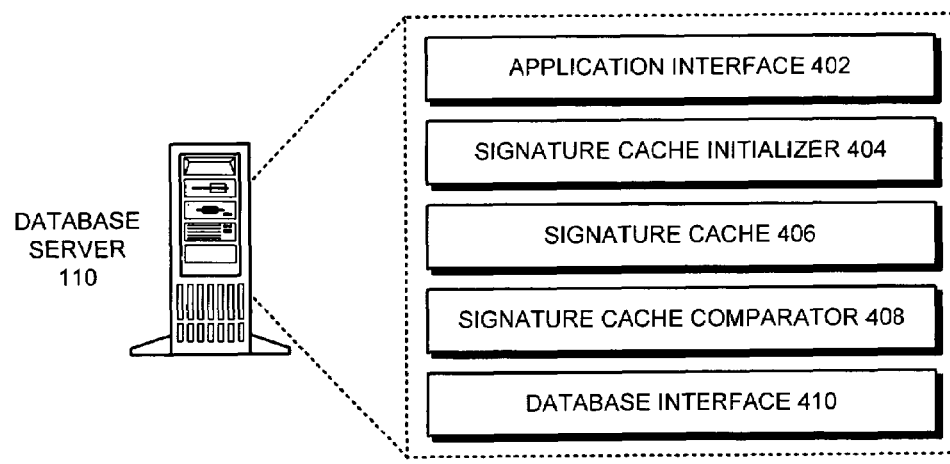
FIG. 4 illustrates a database server in accordance with an embodiment of the present invention.

FIG. 4 illustrates a database server 110 in accordance with an embodiment of the present invention. Database server 110 contains application interface 402, signature cache initializer 404, signature cache 406, signature cache comparator 408, and database interface 410.

Application interface 402 communicates with applications on application server 106 and receives queries from the applications and supplies data to the applications. Queries received from application server 106 are sent to signature cache comparator 408 for validation.

Signature cache initializer 404 initializes signature cache 406 with valid signatures for allowed queries. During an initialization operation, applications on application server 106 are exercised to generate allowed queries in a controlled environment. Signature cache initializer 404 parses these queries to determine a signature for each query. These signatures are stored in signature cache 406. Note that this initialization operation can be part of a regression test prior to release of the system.

A signature for a query specifies a structure for the query base on operations within the query. The signature includes the keywords for the query but remains independent of the literals within the query. This allows the system to validate a query based upon its signature and to reject an invalid query based upon its signature. This operation is described in more detail below.

Signature cache 406 includes the valid signatures that an application can use when querying the database. After signature cache 406 has been initialized, the data in signature cache 406 can be saved to and reloaded from the database. Any acceptable lookup structure can be used for signature cache 406, for example, a hash table or linked list can be used. Note that signature caches already exist in databases and are used to facilitate query processing.

The signature for a SQL query can be the keywords of the SQL query with the literals removed from the SQL query. For example, the signature for the SQL query SELECT prize, color FROM inventory WHERE ProdID=5 can be

SELECT FROM WHERE=.

If this signature is stored in the signature cache, the SQL query is allowed to proceed. However, if the SQL query has been modified by SQL injection to be SELECT prize, color FROM inventory WHERE ProdID=5 OR 1=1, the signature for the query is

SELECT FROM WHERE=OR=.

Since this signature is not in the signature cache, the query is not allowed to proceed.

Initializing the Signature Cache

Figure 5:
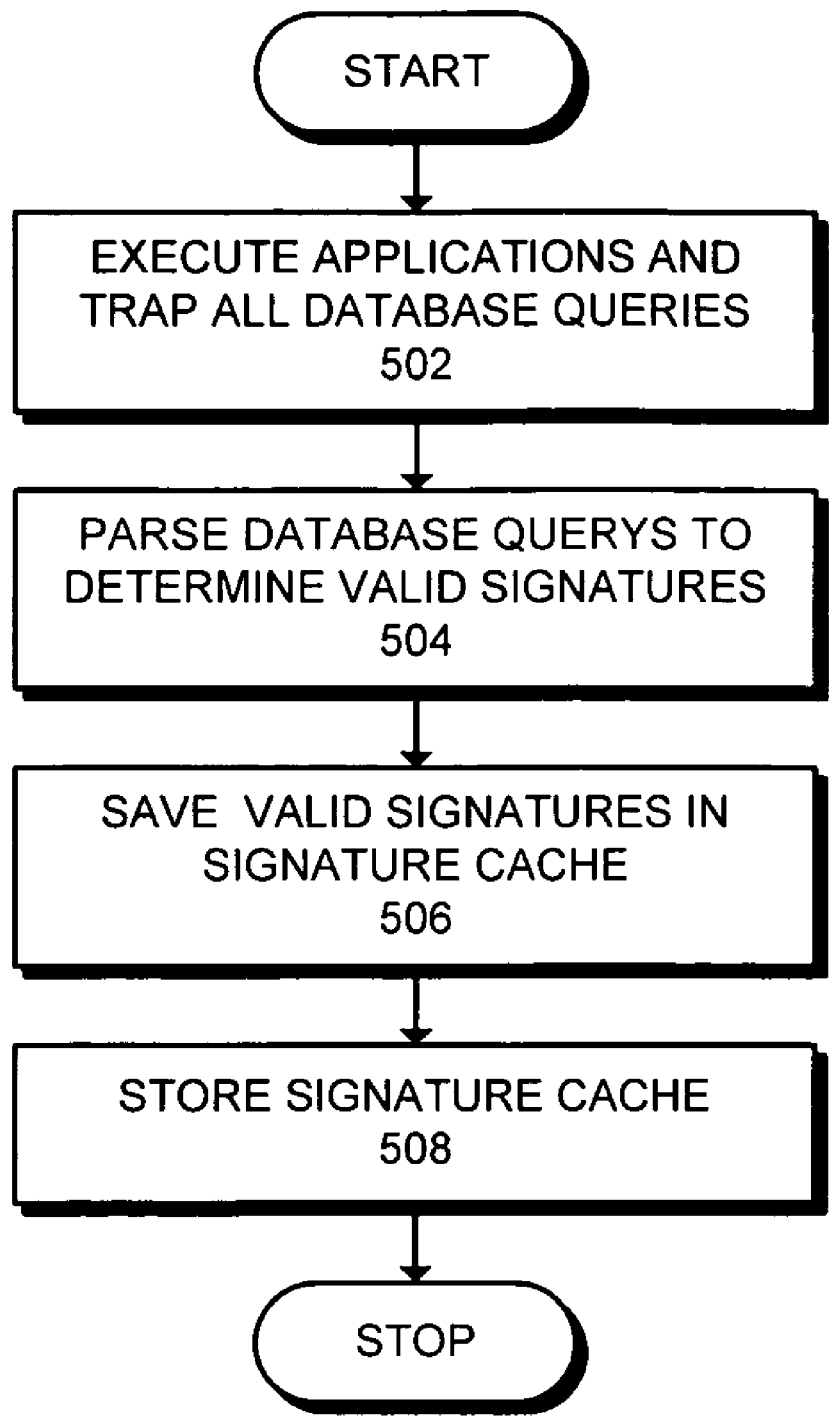
FIG. 5 presents a flowchart illustrating the process of initializing a signature cache in accordance with an embodiment of the present invention.

FIG. 5 presents a flowchart illustrating the process of initializing a signature cache in accordance with an embodiment of the present invention. The system starts by executing the applications in a controlled environment, possibly during regression testing of the applications. During the testing process, the system traps all database queries (step 502). Next, the system parses the database queries to produce a set of valid signatures (step 504).

The system then saves the valid signatures in the signature cache (step 506). Finally, the system stores the signature cache, possibly in the database, for future recall (step 508).

Validating a Query

Figure 6:
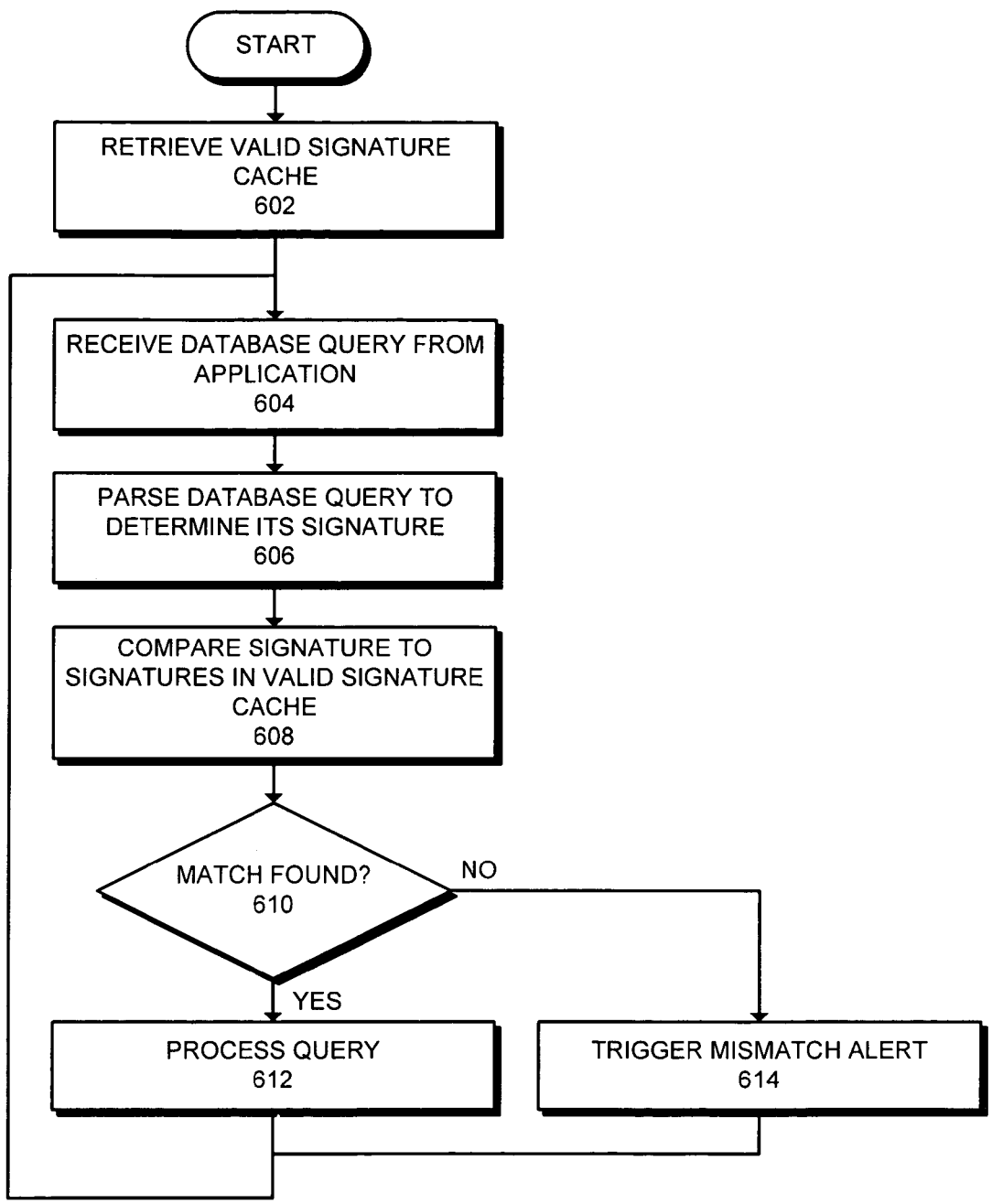
FIG. 6 presents a flowchart illustrating the process of validating a query in accordance with an embodiment of the present invention.

FIG. 6 presents a flowchart illustrating the process of validating a query in accordance with an embodiment of the present invention. The system starts by retrieving the valid signature cache from its storage location (step 602). Next, the system receives a database query from the application (step 604). The system then parses the query to determine its signature (step 606).

After determining the signature for the query, the system compares the signature to valid signatures in the signature cache (step 608). The system then determines if a match was found (step 610). If so, the system processes the query (step 612). If not, the system triggers a mismatch alert (step 614). After processing the query at step 612 or triggering a mismatch alert at step 614, the system returns to step 604 to process a subsequent query.

Mismatch Alert

Figure 7:
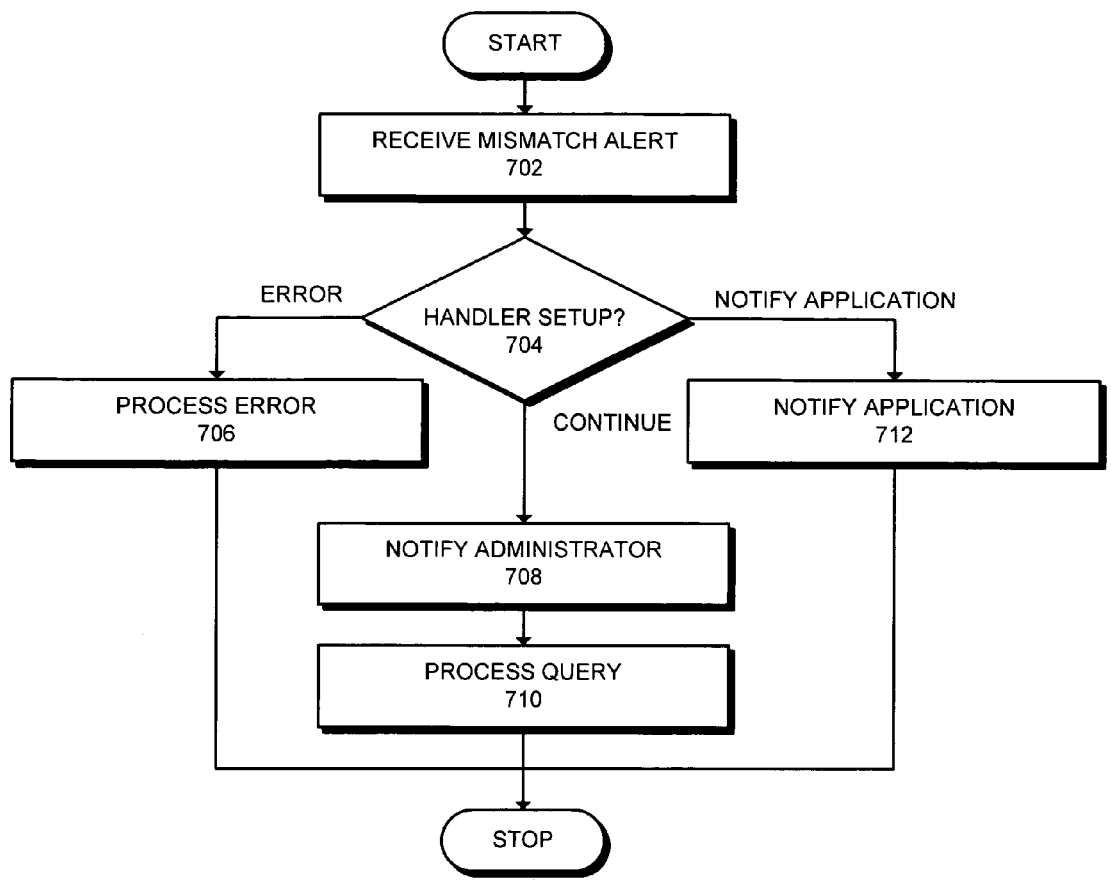
FIG. 7 presents a flowchart illustrating the process of responding to a mismatch alert in accordance with an embodiment of the present invention.

FIG. 7 presents a flowchart illustrating the process of responding to a mismatch alert in accordance with an embodiment of the present invention. The system starts when a mismatch alert is received from the query validation portion of the system (step 702). After receiving the mismatch alert, the system determines how the handler is set to process the mismatch alert (step 704). Note that there are many possible techniques to respond to a mismatch alert. Three possible techniques are described herein.

If the handler is set to an error mode, the system processes the error (step 706). This can include informing an administrator or informing the application of the error. If the handler is set to a continue mode at step 704, the system first notifies an administrator of the mismatch (step 708). After informing the administrator of the mismatch, the system processes the query (step 710). If the handler is set to a notify application mode, the system notifies the application, thereby allowing the application to determine the proper course of action (step 712). The process is complete after steps 706, 710, or 712.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for using query signatures to detect structured query language (SQL) injection, comprising:
    initializing a signature cache, wherein initializing the signature cache involves:
        trapping database queries in a controlled environment,
        parsing the database queries to produce a set of valid signatures, wherein parsing the database queries involves retaining SQL keywords contained in each query, and removing field names and corresponding values in each query, to determine the signature for each query;
            wherein the signature for a query contains the text of SQL keywords and operands without any field name or value in the query, and
        storing the valid signatures in the signature cache;
    receiving a query at the database;
    parsing the query at the database to determine a signature for the query, wherein the signature comprises SQL keywords contained in the corresponding query with literals removed;
    determining if the signature is located in the signature cache, which contains signatures for valid queries; and
    if so, allowing the corresponding SQL query to proceed, otherwise, triggering a mismatch alert.

2. The method of claim 1, wherein the mismatch alert throws an error.

3. The method of claim 1, wherein the mismatch alert is sent to a database administrator and the query is processed.

4. The method of claim 1, wherein the mismatch alert is sent to a requesting application, thereby allowing the requesting application to take action.

5. The method of claim 1, wherein if the signature generates a mismatch alert and if the query is a valid query, the method further comprises allowing a database administrator to add the signature to the signature cache.

6. A computer-readable storage medium storing instructions that when executed by a computer cause the computer to perform a method for using query signatures to detect SQL injection, wherein the computer-readable storage medium includes magnetic and optical storage devices, disk drives, magnetic tape, CDs (compact discs), and DYDs (digital versatile discs or digital video discs), the method comprising:
    initializing a signature cache, wherein initializing the signature cache involves:
        trapping database queries in a controlled environment,
        parsing the database queries to produce a set of valid signatures, wherein parsing the database queries involves determining retaining SQL keywords contained in each query, and removing field names and corresponding values in each query, to determine the signature for each query;
            wherein the signature for a query contains the text of SQL keywords and operands without any field name or value in the query, and
        storing the valid signatures in the signature cache;
    receiving a query at the database;
    parsing the query at the database to determine a signature for the query, wherein the signature comprises SQL keywords contained in the corresponding query with literals removed;
    determining if the signature is located in the signature cache, which contains signatures for valid queries; and
    if so, allowing the corresponding SQL query to proceed, otherwise, triggering a mismatch alert.

7. The computer-readable storage medium of claim 6, wherein the mismatch alert throws an error.

8. The computer-readable storage medium of claim 6, wherein the mismatch alert is sent to a database administrator and the query is processed.

9. The computer-readable storage medium of claim 6, wherein the mismatch alert is sent to a requesting application, thereby allowing the requesting application to take action.

10. The computer-readable storage medium of claim 6, wherein if the signature generates a mismatch alert and if the query is a valid query, the method further comprises allowing a database administrator to add the signature to the signature cache.

11. An apparatus for using query signatures to detect SQL injection, comprising: a processor; a memory;
    an initialization mechanism configured to initialize a signature cache, wherein when initializing the signature cache, the mechanism is configured to:
        trap database queries in a controlled environment,
        parse the database queries to produce a set of valid signatures, wherein parsing the database queries involves retaining SQL keywords contained in each query, and removing field names and corresponding values in each query, to determine the signature for each query;

wherein the signature for a query contains the text of SQL keywords and operands without any field name or value in the query, store the valid signatures in the signature cache;

a receiving mechanism configured to receive a query at the database;

a parsing mechanism configured to parse the query at the database to determine a signature for the query, wherein the signature comprises SQL keywords contained in the corresponding query with literals removed;

a matching mechanism configured to determine if the signature is located in the signature cache, which contains signatures for valid queries;

a processing mechanism configured to process the query if the signature is located in the signature cache; and an alerting mechanism configured to trigger a mismatch alert if the signature is not located in the signature cache.

12. The apparatus of claim 11, wherein the mismatch alert throws an error.

13. The apparatus of claim 11, wherein the mismatch alert is sent to a database administrator and the query is processed.

14. The apparatus of claim 11, wherein the mismatch alert is sent to a requesting application, thereby allowing the requesting application to take action.

15. The apparatus of claim 11, further comprising an adding mechanism configured to allow a database administrator to add the signature to the signature cache if the signature generates a mismatch alert and if the query is a valid query.

* * * * *

UNITED STATES PATENT AND TRADEMARK OFFICE
CERTIFICATE OF CORRECTION

PATENT NO. : 7,487,149 B2
APPLICATION NO. : 10/800315
DATED : February 3, 2009
INVENTOR(S) : Daniel ManHung Wong It is certified that error appears in the above-identified patent and that said Letters Patent is hereby corrected as shown below:

On the cover page, in column 2, in Other Publications, line 10, delete "dectection" and insert -- detection --, therefor.

On the cover page, in column 2, in Other Publications, line 20, delete "Report/pdf>" and insert -- Report.pdf> --, therefor.

In column 2, page 2, in Other Publications, line 3, delete "Ca" and insert -- CA --, therefor.

In column 6, line 22, in claim 6, delete "DYDs" and insert -- DVDs --, therefor.

In column 7, line 6, in claim 11, after "query," insert -- and --.

Signed and Sealed this

Eighteenth Day of May, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,487,149 B2 |
| APPLICATION NO. | : 10/800315 |
| DATED | : February 3, 2009 |
| INVENTOR(S) | : Daniel ManHung Wong |

Page 1 of 1

It is certified that error appears in the above-identified patent and that said Letters Patent is hereby corrected as shown below:

In claim 6 (at column 6, line 29), please delete the word "determining".

Signed and Sealed this

Seventh Day of December, 2010

David J. Kappos
*Director of the United States Patent and Trademark Office*